Feb. 17, 1970  W. STELZER  3,495,882
SKID CONTROL SYSTEM INCLUDING HYDRAULIC MODULATING
VALVE HAVING A MODIFIED CHECK AND BLEED VALVE
Filed Jan. 31, 1968  2 Sheets-Sheet 2
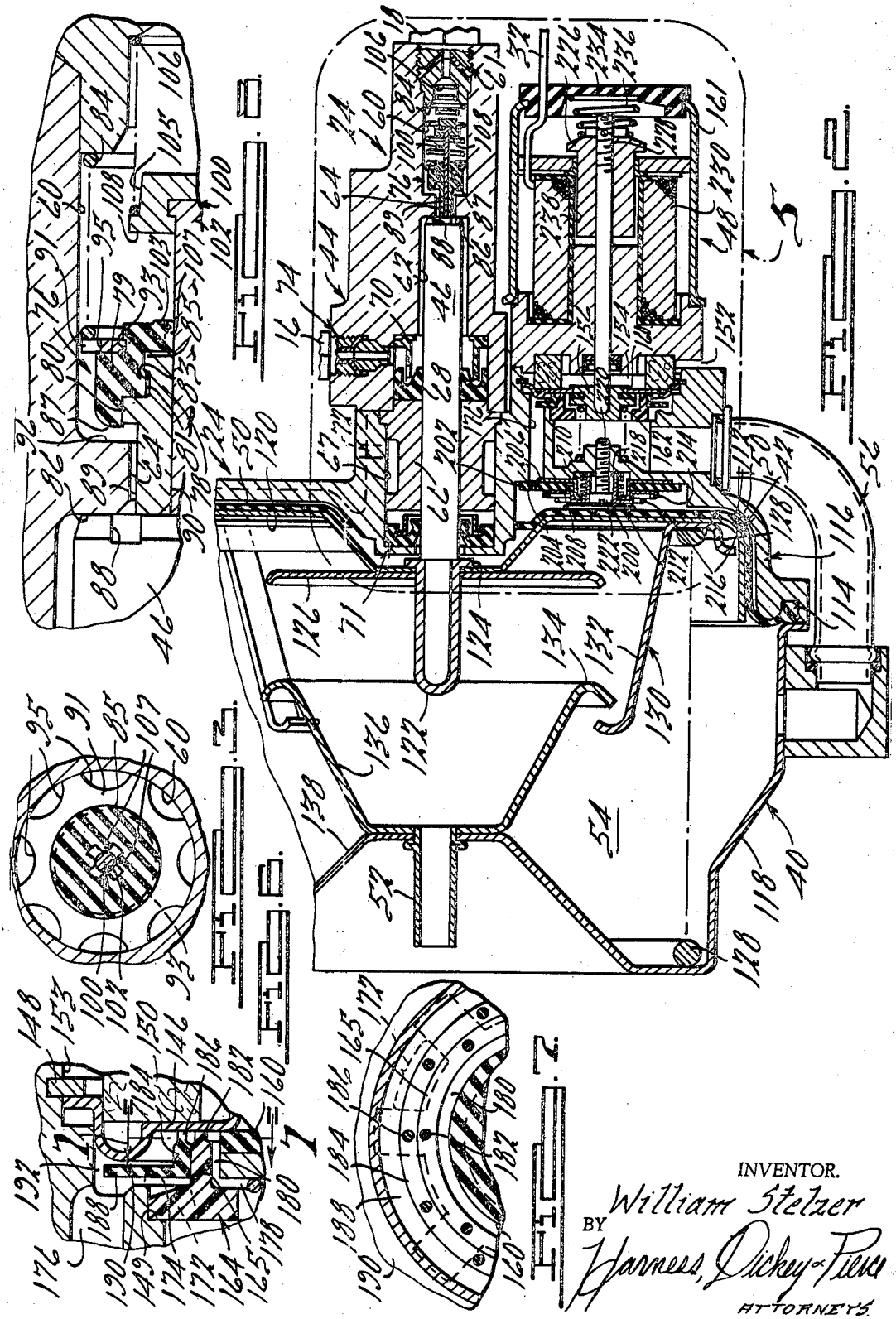
INVENTOR.
William Stelzer
BY
Harness, Dickey-Pierce
ATTORNEYS

United States Patent Office 3,495,882
Patented Feb. 17, 1970

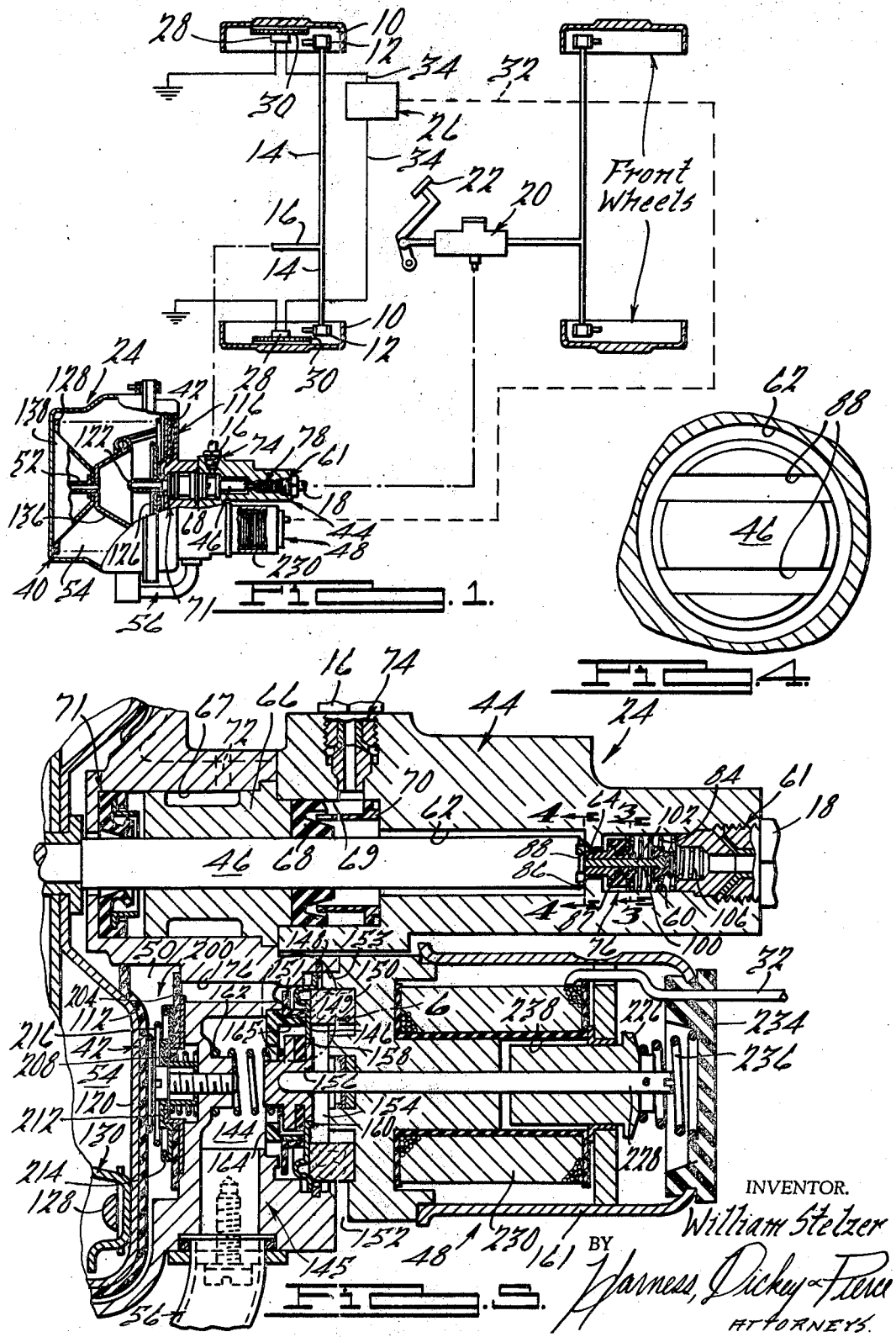

3,495,882
SKID CONTROL SYSTEM INCLUDING HYDRAULIC MODULATING VALVE HAVING A MODIFIED CHECK AND BLEED VALVE
William Stelzer, Bloomfield Hills, Mich., assignor to Kelsey-Hayes Company, Romulus, Mich., a corporation of Delaware
Filed Jan. 31, 1968, Ser. No. 702,095
Int. Cl. B60t 8/06
U.S. Cl. 303—21      6 Claims

ABSTRACT OF THE DISCLOSURE

A skid control system for fluid actuated brakes of a wheeled vehicle including a modulating valve for modulating the fluid pressure to the fluid actuated brakes and having a modified check and bleed valve.

---

The present invention relates to skid control systems, and more particularly relates to a skid control system including a novel control or modulating valve.

It is an object of the present invention to provide a novel skid control system for controlling the brakes of the wheels of a wheeled vehicle.

It is another object of the present invention to provide a novel modulating or control valve having a novel check and bleed valve for use in a skid control system for controlling the brakes of the wheels of a wheeled vehicle.

It is another object of the present invention to provide a novel skid control system for fluid actuated brakes for wheels of a wheeled vehicle including a novel modulating or control valve for modulating or controlling the pressure to the brakes in response to an electrical signal indicating the occurrence or the imminence of a wheel skid condition.

Other objects, features and advantages of the present invention will be come apparent from the subsequent description and the appended claims, taken in conjunction with the accompanyinging drawings, in which:

FIGURE 1 is a generally schematic diagram of a skid control system embodying features of the present invention;

FIGURE 2 is a blown up sectional, fragmentary view of the modulating valve of the system of FIGURE 1;

FIGURE 3 is a sectional view to enlarged scale of the valve of FIGURE 2 taken substantially along the line 3—3 in FIGURE 5;

FIGURE 4 is a sectional view to enlarged scale of the valve of FIGURE 2 taken substantially along the line 4—4 in FIGURE 5;

FIGURE 5 is an enlarged view of that portion of the valve of FIGURE 2 included in the dot-dashed lines indicated by the numeral 5;

FIGURE 6 is an enlarged view of that portion of the valve of FIGURE 5 included in the dot-dashed lines indicated by the numeral 6;

FIGURE 7 is a sectional view of the apparatus of FIGURE 6 taken substantially along the line 6—6; and FIGURE 8 is a fragmentary, enlarged sectional view of the modified check and bleed valve of the present invention.

The skid control system of the present invention can be utilized and will be described specifically for use with an automotive vehicle; however, it should be understood that the features of the invention could be utilized with other types of wheeled vehicles including aircraft. For an automotive vehicle, the system of the present invention can be utilized in connection either with the front wheels, the rear wheels or the front and rear wheels. The system will be described for use in conjunction only with the rear wheels of an automotive vehicle. The present invention is a modification of the modulating valve shown and described in the copending application of Peter Every and William Stelzer, Ser. No. 642,861 filed June 1, 1967 for Skid Control System Including Hydraulic Modulating Valve and that disclosure is incorporated herein by reference and, for purposes of simplicity, so much of that disclosure has been included here as is necessary to understand the present invention.

Looking now to FIGURE 1, the schematic diagram generally shows the skid control system for use with the rear wheels of an automotive vehicle with the rear wheels being equipped with brake drums 10 and wheel brake cylinders 12. Hydraulic lines 14 are connected to the cylinders 12 and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connected between the fluid lines 18 and 16, and hence the modulating valve 24 can control the operation of the brakes. The brakes associated with the brake drum 10 can be of a conventional construction and hence the details thereof have been omitted for the purposes of simplicity.

The modulating valve 24 in the present system is actuated in accordance with an electrical signal obtained from an electrical control module 26. The control module 26 receives information from sensors 28 associated with each of the brake drums 10 by means of exciter rings 30. The exciter rings 30 and sensors 28 can be of constructions known in the art and since the specific details thereof do not constitute a part of the present invention they have been omitted for the purposes of simplicity. The exciter rings 30 can be of a toothed construction and the sensors 28 can be of a permanent magnet or electromagnetic construction which together define a variable reluctance pickup. The exciter rings 30 would be rotated with the brake drums 10 and hence with the associated wheels, and by virtue of the toothed construction, could via sensors 28 generally provide a pulsating or alternating electrical signal via conductors 34 to the module 26 which signal would be an indication of the rotational velocity of the associated wheels.

The control module 26 can be constructed to sense the rate of change in the signal at the conductors 34 and hence to sense the deceleration rate of the wheels associated with the brake drums 10 and to provide an output signal in response to the magnitude of the deceleration of the wheels associated with the brake drums 10 reaching a preselected magnitude corresponding to a skid condition existing or to be occurring at the wheels associated with drums 10. The output or control signal will be transmitted by means of conductor 32 to the modulating valve 24. In the system of the present invention the control module 26 can provide merely an "on" or "off" signal and modulation of the fluid pressure to the brake cylinders 12 will be provided by the modulating valve 24. In some skid control systems the fluid pressure to the brakes s varied in response to an electrical output signal of varying magnitude. In the present invention, the fluid pressure is varied by the valve 24, in response to a signal of generally constant amplitude which permits the remainder of the system to be simplified.

The skid control system of the present invention for fluid actuated brakes for braking of the vehicle varies or controls the fluid pressure to the brake system. Under certain road conditions application of maximum brake pressure (or less) will result in skidding and a locked-wheel and/or skid condition. If the vehicle wheels are locked or are skidding excessively, the coefficient of friction between the surface of the road and the vehicle tire decreases and the effectiveness of the brake system in stopping the vehicle is substantially reduced. It has been theorized that the maximum coefficient of the friction and hence the most effective braking can be realized when the wheel slip is between 10 and 20%. Wheel slip has been defined as the ratio of the difference between car velocity ($Vc$) and braked wheel velocity ($Vw$) to car velocity ($Vc$) or $(Vc-Vw)/Vc$. A brake pressure curve for braking the vehicle at the desired slip and hence utilizing the maximum coefficient of friction can be determined (see copending application, supra). Brake pressures slightly above that curve will result in excessive pressure and wheel skid. The maximum pressure to provide desired wheel slip is less than the maximum obtainable pressure of the system and hence relief from the maximum brake pressure is desirable in order to stop the vehicle in the shortest distance. It is a function of the system of the present invention to provide operational characteristics which will simulate or closely simulate the ideal brake pressure curve.

In the system of the present invention, the modulating valve 24 in response to the output signals from the module 26 will provide for a modulated brake pressure which approximates the ideal brake pressure curve and hence provides characteristics for stopping the vehicle in the shortest possible distance.

In general the modulating valve 24 has a vacuum chamber housing 40 divided by a diaphragm assembly 42. A hydraulic cylinder housing 44 is mounted to the housing of the vacuum chamber housing 40 and has slidably located therein a hydraulic piston 46 which is mechanically linked to the diaphragm assembly 42. Mounted to one side of the hydraulic cylinder housing 44 is solenoid 48 whose plunger seats itself over an atmospheric air inlet port to shut off the introduction of atmospheric air pressure into one side 50 of the vacuum chamber housing 40 when no skid control is indicated. The vacuum housing chamber 40 is held at vacuum through engine (not shown) vacuum via engine vacuum line 52 which communicates to the other side 54 of the vacuum chamber 40. A conduit 56 and a normally opened vacuum port communicate the opposite side 50 to vacuum. When the control module 26 provides an output signal indicating a skid condition energization of the solenoid 48 occurs and the solenoid plunger is unseated from the atmospheric air inlet port allowing atmospheric air pressure to enter the opposite side 50 of the chamber housing 40. At the same time the vacuum port is closed by actuation of solenoid 48. With the differential pressure created the diaphragm assembly 42 is moved permitting the hydraulic piston 46 to move. As the piston 46 moves the available volume within the hydraulic cylinder housing 44 increases and at the same time a check valve 76 is seated cutting off any further application of master cylinder pressure to the brakes of the wheels being skid controlled. The brake cylinder pressure which has already been built up will be relieved by flowing into the increased volume created in the hydraulic cylinder housing 44 by the movement therefrom of the hydraulic piston 46. With relief of brake cylinder pressure the associated wheel can spin up or increase in speed and the control module 26 will de-energize the solenoid 48 allowing the plunger of solenoid 48 to return with the atmospheric air inlet port being closed again and the vacuum port to the one side 50 being opened. In this condition the piston 46 and diaphragm assembly 42 return towards their original positions. At the original position of piston 46, the check valve 76 (see FIGURES 2, 5 and 8) is unseated permitting master cylinder pressure to be applied through the valve 24 directly to the brake cylinders 12.

The hydraulic cylinder housing 44 is connected to a generally cup shaped chamber section 116 of the vacuum chamber housing 40 and has a first cylinder 60 which has one end connected to the hydraulic line 18 from the master cylinder 20 via a conventional fitting assembly 61. The cylinder 60 houses the new and improved check valve 76 and a bleeder valve 100 to be described. The first cylinder 60 is connected to a relief cylinder 62 in which is located the hydraulic piston 46. A bore 64 interconnects the cylinders 60 and 62 and is of a reduced diameter relative thereto. The relief cylinder 62 is connected in line with an enlarged bore 67 in the chamber section 116. A support bearing 66 is located in the bore 67 and extends partially into an enlarged portion 69 of the cylinder 62 and slidably supports the piston 46. The piston 46 extends into the relief cylinder 52 in radially clearance relation and is also extensible into the vacuum chamber housing 40. A hydraulic seal 68 is located adjacent bearing 66 at the end of the enlarged portion 69 of cylinder 62 and provides a fluid seal against the surface of the piston 46. At the inner end of the enlarged bore 67 is located a vacuum seal assembly 71 which prevents loss of vacuum from the one side 50 of the vacuum chamber housing 40. The enlarged bore 67 is vented to atmosphere via a port 72 and the atmospheric pressure is used to aid the seal 71 in its sealing function.

The fluid line 16 is connected in fluid communication with the enlarged portion 69 of relief cylinder 62 via hydraulic fitting assembly 74 and hence fluid to the brake cylinders 12 must pass from line 18 through cylinder 60, bore 64 and relief cylinder 62 to line 16.

The check valve assembly 76 is located in cylinder 60 and bore 64 and includes a valve body which has an enlarged head portion 80 located in the cylinder 60. The valve body 78 has an annular, flexible seal 79 having a radially inwardly extending ring portion 81 which fits in a groove 83 located between head portion 80 and a reduced diameter flange 85. The flexible seal 79 generally is cup-shaped and overengages the head portion 80, groove 83, flange 85 and the rearward surface of valve body 78. The forward end of the seal 79 has an annular sealing lip 87 which extends axially beyond the forward end of head portion 80 and provides a sealing action in a manner to be described. The valve body 78 has a forwardly extending portion 89 which is of reduced diameter and which extends through bore 64 and provides a substantial radial clearance therewith to facilitate the flow of fluid therebetween. An annular ring 91 is supported in an annular groove 93 at the rearward end of seal 79 and is in close clearance relation with the walls of bore 60. The outer periphery of ring 91 is notched (see FIGURE 3) as at 95 to provide for unrestricted fluid flow between opposite sides of ring 91. Thus the ring radially pilots the valve body 78 and seal 79 permitting for an enlarged passage between the forward portion 89 of valve body 78 and bore 64. A spring member 84 is engagement with the ring 91 and is biased to continuously urge the valve body 78 to a closed position. The hydraulic piston 46 is normally held in engagement against the annular shoulder 86 which is defined by the juncture of bore 64 and the relief cylinder 62. The end of the piston 46 has a pair of radially separated straight cross slots 88 (defining chords in the circular end of piston 46) which are in communication with the substantial clearance between bore 64 and forward portion 89 of the valve body 78. In a normally deactuated condition of the modulating valve 24 with the piston 46 located against the shoulder 86, the spring 84 urges the valve body 78 toward the cylinder 62 with the forward portion 89 engaging the end of the piston 46. In this condition the sealing lip 87 is located in clearance relation with walls of the cylinder 60 and hence communicates the cylinder 60 with the cylinder 62 via the clearance past bore 64 and cross slots 88. In this condition normal braking can be effectuated since fluid can freely pass from line 18 from the master cylinder 20 to line 16 to the wheel brake cylinders 12 via the modulating valve 24. Upon the occurrence of a skid condition whereby a skid control output signal is derived from the control module 26, the piston 46 is moved outwardly from the relief cylinder 62 and the spring 84 moves the valve body 78 in the same direction moving the sealing lip 87 into engagement with a shoulder 96 of the cylinder 60 to substantially seal cylinder 60 from cylinder 62. At this point fluid from the master cylinder 20 to conduit 18 is generally cut off.

As previously noted a bleed valve assembly 100 is located in the cylinder 60 and is also actuated by the piston 46 and hence upon sufficient movement of piston 46 out of cylinder 62 the bleed valve assembly 100 will also be closed.

The bleed valve assembly 100 includes an elongated stem 102 which extends through a bore 90 in valve body 78 and is in close clearance therewith. The terminating end of the elongated stem 102 is located against the end of the piston 46 when the valve assembly 100 is in its normally deactuated position as shown in FIGURE 4. The opposite end of the elongated stem 102 is connected to a cap 105 which is engaged by a spring 106 which urges the cap 105 and stem 102 in a direction toward the cylinder 62 to a closed position. The elongated stem 102 has an annular sealing surface 108 which, with the elongated stem 102 in its end actuated position, will engage an annular, rearward facing sealing boss 103 in the seal 79 to close the clearance passage between the bore 90 and stem 102. In its actuated, closed position the stem 102 extends substantially beyond the end of stem or forward portion 89 of the valve body 78 such that on the return of piston 46 the bleed valve assembly 100 will be opened before the check valve assembly 76; this serves a purpose to be later described. Since actuation of the piston 46 is rapid, closing of the main passage through the check valve assembly 76 and the closing of the secondary restricted passage through the bleed valve assembly 100 occur in relatively rapid succession. The seal 79 has a radially inner surface 107 which engages the stem 102; the surface 107 is scalloped to permit flow of fluid for the bleed valve function. Note that the seal 79 provides a sealing function for the check valve 76 and also for the bleed valve 100.

As the hydraulic piston 46 is withdrawn from the cylinder 62 its available volume is increased whereby the fluid pressure in the cylinder 62 and in the line 16 and hence in the wheel brake cylinder 12 will be relieved. Relief of the fluid pressure will cause a decrease in the braking of the associated wheels hence permitting the wheels to spin up or to regain speed.

In operation brake pressure will be increased until a skid condition occurs; this condition will be sensed as previously described and control module 26 will transmit an output control signal to actuate the solenoid 48 whereby the piston 46 will be moved out of the cylinder 62 resulting in a decrease in the brake pressure. Subsequently the vehicle wheel will have spun up or regained speed whereby the output signal from the module 26 is terminated whereby the initial actuation of the modulating valve 24 by means of the solenoid 48 is discontinued. Note that the initial brake pressure was above the ideal pressure and upon actuation of the modulating valve 24 the brake pressure dropped to a point below the ideal pressure. With the brake pressure above or below the ideal the maximum coefficient of friction for braking is not realized. It is a feature of the present invention that the modulating valve 24 is constructed to return the fluid pressure quickly to a point which is proximate to the ideal pressure and then to provide for a gradual increase of the fluid pressure curve whereby nearly ideal brake pressure will be provided; this is accomplished by the construction to be described.

The piston 46 is freely sliding within the support bearing or bushing 66 and is actuated by the diaphragm assembly 42 located within the vacuum chamber housing 40. The assembly 42 includes a flexible diaphragm member 112 which has an annular outer bead 114 which is sealingly clamped between a flange on the chamber section 116 and a flange on a cap section 118. The sections 116 and 118 define the vacuum chamber housing 40. A generally cup-shaped power or diaphragm plate 120 is located in engagement with the diaphragm member 112, with the diaphragm member 112 being flexible and taking the shape of the power plate 120. The diaphragm assembly 42 further includes a flanged cap 122 which is located with a flange portion 124 engaging one side of a dished central portion of the power plate 120 and is held thereto by a stop plate 126 which is secured to the cap 122 on the opposite side of the dished portion of the power plate 120. The diaphragm assembly 42 divides the vacuum chamber housing 40 into the section 50 on one side and section 54 on the other side.

A coil spring 128 has one end in engagement with the cap section 118 and has its opposite end located in a spring retainer assembly 130. A plurality of spring hooks 132 are circumferentially spaced on retainer assembly 130 and, upon disassembly of cap section 118 from chamber section 116, will engage an annular lip portion 134 on a generally cup-shaped member 136 which is secured to an inwardly dished portion 138 at the rearward end of the cap section 118 thereby holding cap section 118, spring 128, and retainer assembly 130 together. Spring 128 is precompressed to bias the retainer assembly member 130 against the power plate 120 forcing that member to its extreme inner position in the vacuum chamber section 50. The cap 122 has a cavity which receives and engages the protruding end of the hydraulic piston 46. In the deactuated condition of valve 24, the spring 128 maintains the power plate 120 and hence the diaphragm 112 at its innermost position in section 50 of the vacuum chamber housing 40; at this innermost position, the hydraulic piston 46 by virtue of engagement with the cap 122 is held in engagement against the shoulder 86 of the relief cylinder 62. The bias of the spring 128 is selected to provide a preload of sufficient magnitude to overcome the maximum force on the piston 46 as the result of the maximum fluid pressure in the cylinder 62 acting on the end of the piston 46.

Vacuum line 52 is connected at the dished portion 138 in communication with the interior of vacuum chamber 54 at one side of diaphragm assembly 42. Upon actuation of the modulating valve 24, air pressure via the atmosphere is applied to the section 50 of the vacuum cylinder chamber housing 40. The area of the diaphragm assembly 42 is sufficient such that the air pressure will provide a force great enough to overcome the bias of spring 128 to move the diaphragm assembly 42 toward vacuum section 54 until the stop plate 126 engages the portion 134 of the cup member 136. At this point the maximum relief of the brake pressure to the brakes is obtained.

The conduit assembly 56 is in fluid communication with the vacuum section 54 and is connected to vacuum and pressure port asemblies (see FIGURES 2 and 5). The assembly 56 is connected to and in communication with a cavity 144 located in a port housing portion 145 which is a part of the chamber section 116. The cavity 144 terminates rearwardly in housing portion 145 in a plurality of stepped counterbores 149, 151, 153 of increasing diameters. A housing assembly 161 holds the solenoid 48 and is secured to the housing portion 145 of chamber section 116 with the solenoid 48 in line with cavity 144 and counterbores 149, 151, 153. The rearward end of cavity 144 is generally closed by an annular sealing member 146 held in counterbore 153 by a retaining washer 148 against the radially outer end surface of sealing member 146. An annular air filter member 150 is held against the radially outer end surface of the sealing member 146 by means of the housing assembly 161. An opening 152 between solenoid housing assembly 161 and housing portion 145 communicates atmosphere through filter 150 to a cylinder portion 154 defined by the air filter 150, the sealing member 146 and the end of the solenoid housing assembly 161. The sealing member 146 has a central opening 158 defining a port; a cap member 156 has a sealing member 160 held in sealing engagement with the inside surface around the central opening 158 by a coil spring 162 located in the cylinder 144. With the cap 156 in the position shown in FIGURE 5 cylinder 144 is sealed from cylinder 154 and hence from atmospheric air pressure. An annular sealing member 164 is located in the coutnerbore 149 (see FIGURES 5 and 6) and generally has an annular portion 165 which concentrically receives at least a part of the cap 156. A flexible valve member 184 constructed of rubber or some other resilient material is located in coutnerbore 151 upon the annular portion 165 of member 164 and has an annular sealing flange 188 which is spaced away from the outer end of the counterbore 149 to define a fluid path 174 and is spaced away from the rearward end of the sealing washer 146 whereby a second fluid path 190 is defined. Since the sealing flange 188 is also spaced from the surface of counterbore 151 a clearance space 192 communicates paths 174 and 190.

Two paths from the cylinder 144 are defined by members 164 and 184. The member 164 has a peripheral radially outer surface edge provided with a plurality of circumferential slots 172 which communicate cylinder 144 with passage 174. Fluid passage 174 communicates with a plurality of slotted bores 176 which open into the vacuum section 50 in a manner to be described. The second path to the cylinder 144 includes the radially extending annular path 178 and the axially extending path 180 which are defined by the space between the cap 156 and member 164. The sealing member 164 has the extremity of its annular portion 165 in engagement with the adjacent surface of sealing washer 146 while the valve member 184 has its axially outer end similarly in engagement with washer 146. The paths 178, 180 communicate to path 190 through the spaces between the projections 182 and 186. The path 190 in turn communicates with bores 176 via path 192.

The bores 176 are in fluid communication with the vacuum section 50 through a throttling valve assembly 200. The throttling valve assembly has an annular flexible valve seal member 202 which is normally in sealing relationship with the bores 176. A small bleed hole 204 in the member 202 communicates between the section 50 and one of the bores 176 and hence to cylinder 144. An annular support member 206 holds and supports the annular flexible valve seal 202 and has a cup-shaped portion 208 in which is located a spring member 210 which engages the portion 208 and the inner surface of the chamber section 116 under a precompressive force. The spring 210 urges seal support 206 and seal valve 202 inwardly into the section 50. An annular spring retainer 212 has a radially outer lip 214 which holds a conical coil spring 216. Spring 216 extends into the section 50 and, with the diaphragm 112 located at its rearwardmost position, is in engagement therewith. The diaphragm assembly 42 compresses the spring 216 and holds the throttle valve assembly 200 in its closed position. The spring support 212 has a cup portion 218 at its center section; a screw member 220 is located within the cup portion 218 and is threaded into the chamber section 116 and has an enlarged head 222 which is movable within the cup portion 218, but which is engageable with the extremity thereof to limit the inner movement of throttle valve 200. With the modulating valve 24 deactuated (in a condition as shown in the drawings) the diaphragm assembly 42 will maintain the throttle valve 200 closed. However, vacuum from the section 54 is in communication with the section 50 by virtue of the fluid path as previously described and through the restriction 204.

The solenoid 48 includes a movable armature assembly 226 and includes a plunger 228 connected thereto and is actuated by energization of a plurality of windings 230 connected to conductor 32 from module 26. The armature assembly 226 includes spring 236 located at its outer end and engageable with an end cap 234 on housing assembly 161. Upon energization of the solenoid 48, the armature 226 is drawn inwardly into cavity 238 in solenoid 48 moving the plunger 228 inwardly. Plunger 228 engages cap 156 and will move the cap 156 inwardly into cylinder 144. By movement of the cap 156 into the cylinder 144, the annular seal 160 will be moved from sealing washer 146 opening a path therearound; at the same time the cap 156 will be moved into engagement with the radial surface of counterbore 165 in sealing washer 164 wherein the radial path 178 will be closed. With path 178 closed one of the vacuum paths from the section 54 to the section 50 will have been closed. At the same time, a fluid path is defined in the space now between the seal 160 and the sealing washer 146 and air under pressure will flow through the voids between the projections 182 and 186 and through the path 190. The air pressure on the flexible sealing flange 188 will cause it to deflect into sealing engagement with the outer end of the counterbore 159 thereby closing the fluid path 174 resulting in the second fluid path to vacuum being closed. A path for the atmospheric air is provided around the flange 188 via the path 192 into the bores 176. The air under pressure will deflect the seal 202 away from the bores 176 whereby air can rapidly move into the section 50 moving the diaphragm 112 and power plate 120 inwardly into the section 54. As this occurs and as the diaphragm 112 is moved away from the throttle valve assembly 200, the conical coil spring member 216 will no longer be engaged and the spring 210 will then force the seal support 206 and flexible seal 202 outwardly away from the openings 176 completely opening the air path to section 50. As the wheels spin up and the signal from the module 26 is discontinued, the solenoid 48 will be deenergized permitting the return of plunger 228 back to its original position with the spring 152 moving the cap 156 out of sealing engagement with the sealing washer 164 and again moving the seal 160 into engagement with the sealing washer 146, thereby closing the path to atmospheric air. At this time the two paths to vacuum are opened thereby permitting the spring 128 to move the diaphragm assembly 42 quickly toward its closing position. As this occurs the piston 46 will be moved again into the cylinder 62 thereby reducing the available volume of cylinder 62 causing pressure to be reapplied to the brakes. This occurs rapidly. As the diaphragm assembly 42 approaches its end position, it engages the conical spring 216 causing the throttle valve 200 to be moved to its position in which the flexible valve seal 202 closes the bores 176. At this time the air remaining in section 50 will be returned to vacuum through the bleed hole 204. The bleed hole 204 offers a substantial restriction to flow of air which results in a throttling effect or a slowing down of the return of the diaphragm assembly 42. This also slows down the return of the hydraulic piston 46. The throttling effect results in the brake pressure being reapplied at a reduced rate and will continue either until the diaphragm assembly 42 has reached its final position or utnil another output signal is received from the control module 26.

As previously noted, two vacuum paths to the cylinder 144 were provided one including annular path 174, another including annular path 190. In evacuating the air from the section 50 upon the actuation of the solenoid 48 in order to provide for a quick return of the diaphragm assembly 42, it is necessary that the path to the cylinder 144 and hence to the section 54 be generally unrestricted. The second path including the path 190, the axial path 180, and radial paths 178 is somewhat restricted specifically through the radial path 178. In order to increase the area of the path 178, it would be necessary to increase the gap between the cap 156 and the radial surface of the counterbore of the seal member 164. In closing this first path, to admit air under pressure, the increased gap would require that the plunger 228 of the solenoid 48 move farther to a closed position. As the distance of travel of the plunger 228 is increased, the required size of the solenoid 48 increases; in order to maintain the solenoid 48 at a minimum size the radial path 178 can be made of a minimum size and the second fluid path including the annular path 174 and the grooves 172 will provide adequate flow for evacuation of air from section 50. However, the second path must be also closed during the admission of air under pressure; this is accomplished by the flexible flange portion 188 which is deflected to a closed position as air pressure is applied through paths 190 and 192 to the section 50.

Depending upon the conditions of the road and the fluid requirements of the brake system (due to fade, etc.) the ideal required pressure may change and it is desirable that actual applied pressure follow. The bleed valve assembly 100 aids in this regard. As the piston 46 is moved back to its original position upon deenergization of the solenoid 48, it engages the stem 102 of the bleed valve assembly 100 prior to engagement with the stem 82 of the check valve 78. When this occurs fluid from the master cylinder 20 to the fluid line 18 will gradually be applied to the wheel brake cylinders 12 through the restricted path defined by the slight clearance between the bore 104 and the stem 102. This will permit a gradual or controlled increase in the brake pressure and result in the actual presure closely following the ideal pressure even when an increase in brake pressure or more fluid is required by the system. If the bleed valve 100 were not utilized and if additional pressure were required by the system before the occurence of another skid condition, then when the piston 46 opened the check valve 76 a sharp or uncontrolled increase in pressure could occur resulting in a substantial departure from the ideal pressure requirement. Thereby use of the bleed valve assembly 100 in combination with check valve 76, the modulating valve 24 will provide an actual brake pressure closely approximately the ideal brake pressure.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a modulating valve for a skid control system for at least one wheel of a wheeled vehicle having brakes, actuable from a source of fluid pressure and having a piston located in a relief cylinder and normally located at a first position therein proximate to a through bore communicating the relief cylinder and movable to a second position away from the through bore to provide pressure relief with the through bore normally in communication with the source via a second cylinder, the improvement comprising a check valve located in the second cylinder and having a valve body, a flexible seal supported on said valve body and being engageable with a sealing surface surrounding the through bore to generally block flow of fluid through the through bore, a nose portion on said valve body extensible into the through bore in substantial clearance with the through bore and engageable with the piston in its first position for maintaining said valve body at a position with said seal out of sealing engagement with the sealing surface and with the piston in its second position for permitting said valve body to move to a different position with said seal in sealing engagement with the sealing surface, and bias means for urging said valve body to its different position, said check valve including a guide ring operatively connected with said seal for radially locating and guiding said valve body and said seal within the second cylinder, said guide ring being supported on said seal and having a substantial fluid passage for freely communicating fluid on opposite sides of said ring, said bias means including a spring member, said valve body having an enlarged head portion adjacent said nose portion, said seal having a radially inner portion located within a groove in said valve body and having a sealing lip extending generally over said head portion and extending axially therebeyond for engaging the sealing surface.

2. In a modulating valve for a skid control system for at least one wheel of a wheeled vehicle having brakes, actuable from a source of fluid pressure and having a piston located in a relief cylinder and normally located at a first position therein proximate to a through bore communicating the relief cylinder and movable to a second position away from the through bore to provide pressure relief with the through bore normally in communication with the source via a second cylinder, the improvement comprising a combination check and bleed valve located in the second cylinder and having a valve body, first seal means on said valve body engageable with a sealing surface associated with the through bore to generally block the flow of fluid therethrough, connecting means operatively connected with said valve body and the piston and extending through the through bore in substantial clearance with the through bore and engageable with the piston in its first position for maintaining said valve body at a position with said first seal means out of sealing engagement with the sealing surface and with the piston in its second position for permitting said valve body to move to a different position with said first seal means in sealing engagement with the sealing surface, first bias means for urging said valve body to its said different position, bleed valve means having a first condition defining a restricted bleed path relative to said valve body and a second condition for blocking said bleed path.

3. The apparatus of claim 2 with said bleed valve means comprising a member having an elongated stem extending in close clearance relation through a different bore through said valve body with said bore clearance relation defining said bleed path, second bias means for urging said stem into said different bore with said stem engaging the piston with the piston in its first position and with said bleed valve means in its first condition.

4. The apparatus of claim 3 with said bleed valve means further comprising second seal means for closing said bleed path in said second condition in response to the piston being in its second position.

5. The apparatus of claim 4 with said first seal means comprising a flexible seal supported on said valve body, said bleed valve means comprising a head member connected with said stem, said head member having a bleed sealing surface engageable with an annular sealing portion on said flexible seal for sealing said bleed path, said second bias means comprising a spring for urging said stem through said different bore and said bleed sealing surface into sealing engagement with said sealing portion.

6. The apparatus of claim 5 with said connecting means comprising a nose portion on said valve body with said nose portion extending partially into the first cylinder when the piston is in its second position and said valve body is in its different position and with said stem extending further than said nose portion into the first cylinder when the piston is in its second position and said bleed valve means is in its second condition whereby on return of the piston to its first position the piston will first engage said stem of said bleed valve means to open said bleed path before it engages said nose portion to move said first seal means out of sealing engagement with the sealing surface.

References Cited

UNITED STATES PATENTS

| | | | |
|---|---|---|---|
| 1,913,664 | 6/1933 | Finger | 137—543.21 |
| 2,736,338 | 2/1956 | Britton | 137—543.21 XR |
| 3,223,459 | 12/1965 | Packer | 303—21 |

MILTON BUCHLER, Primary Examiner

JOHN J. McLAUGHLIN, Jr., Assistant Examiner

U.S. Cl. X.R.

137—543.21; 188—181; 303—6